United States Patent
Ikeyama

(10) Patent No.: US 10,680,451 B2
(45) Date of Patent: Jun. 9, 2020

(54) BATTERY SYSTEM FOR VEHICLE

(71) Applicant: TOYOTA JIDOSHA KABUSHIKI KAISHA, Toyota-shi, Aichi-ken (JP)

(72) Inventor: Toshio Ikeyama, Toyota (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 201 days.

(21) Appl. No.: 15/884,611

(22) Filed: Jan. 31, 2018

(65) Prior Publication Data
US 2018/0222323 A1 Aug. 9, 2018

(30) Foreign Application Priority Data

Feb. 6, 2017 (JP) .................................. 2017-019432

(51) Int. Cl.
*B60L 3/00* (2019.01)
*H02J 7/00* (2006.01)
*H02P 27/08* (2006.01)
*H02J 7/34* (2006.01)
*B60L 58/20* (2019.01)

(52) U.S. Cl.
CPC .......... *H02J 7/0029* (2013.01); *B60L 3/0007* (2013.01); *B60L 58/20* (2019.02); *H02J 2310/48* (2020.01); *Y02T 10/7005* (2013.01); *Y02T 10/7066* (2013.01)

(58) Field of Classification Search
CPC . H02J 50/12; H02J 50/00; H02J 17/00; G06F 1/3287; A61N 1/3785; A61N 1/3787; A61B 5/04004; A61B 2560/0219; A61B 5/0402; A61B 5/0476; A61B 5/0488; A61B 2560/0214; G05F 1/613; Y02D 10/171
See application file for complete search history.

(56) References Cited

U.S. PATENT DOCUMENTS

2016/0090052 A1\* 3/2016 Nishijima ............... B60L 58/14
307/9.1

FOREIGN PATENT DOCUMENTS

| JP | 2003165406 A | \* | 6/2003 |
| JP | 2014-141112 A | | 8/2014 |
| JP | 2015020617 A | \* | 2/2015 |

OTHER PUBLICATIONS

Translation of JP 2003165406 (Year: 2003).\*
Translation of JP 2015020617 (Year: 2015).\*

\* cited by examiner

*Primary Examiner* — Rexford N Barnie
*Assistant Examiner* — Elim Ortiz
(74) *Attorney, Agent, or Firm* — Sughrue Mion, PLLC

(57) ABSTRACT

A battery system for a vehicle includes an auxiliary battery, first electric loads electrically connected to the auxiliary battery through first relays, a first electronic control unit electrically connected to the auxiliary battery through a second relay, the first electronic control unit being configured to turn on and off at least the first relays and the second relay, and a collision detection device configured to transmit a collision detection signal to the first electronic control unit when detecting a collision of the vehicle. The first electronic control unit is configured to switch the first relays from on to off, while keeping the second relay turned on when receiving the collision detection signal.

3 Claims, 2 Drawing Sheets

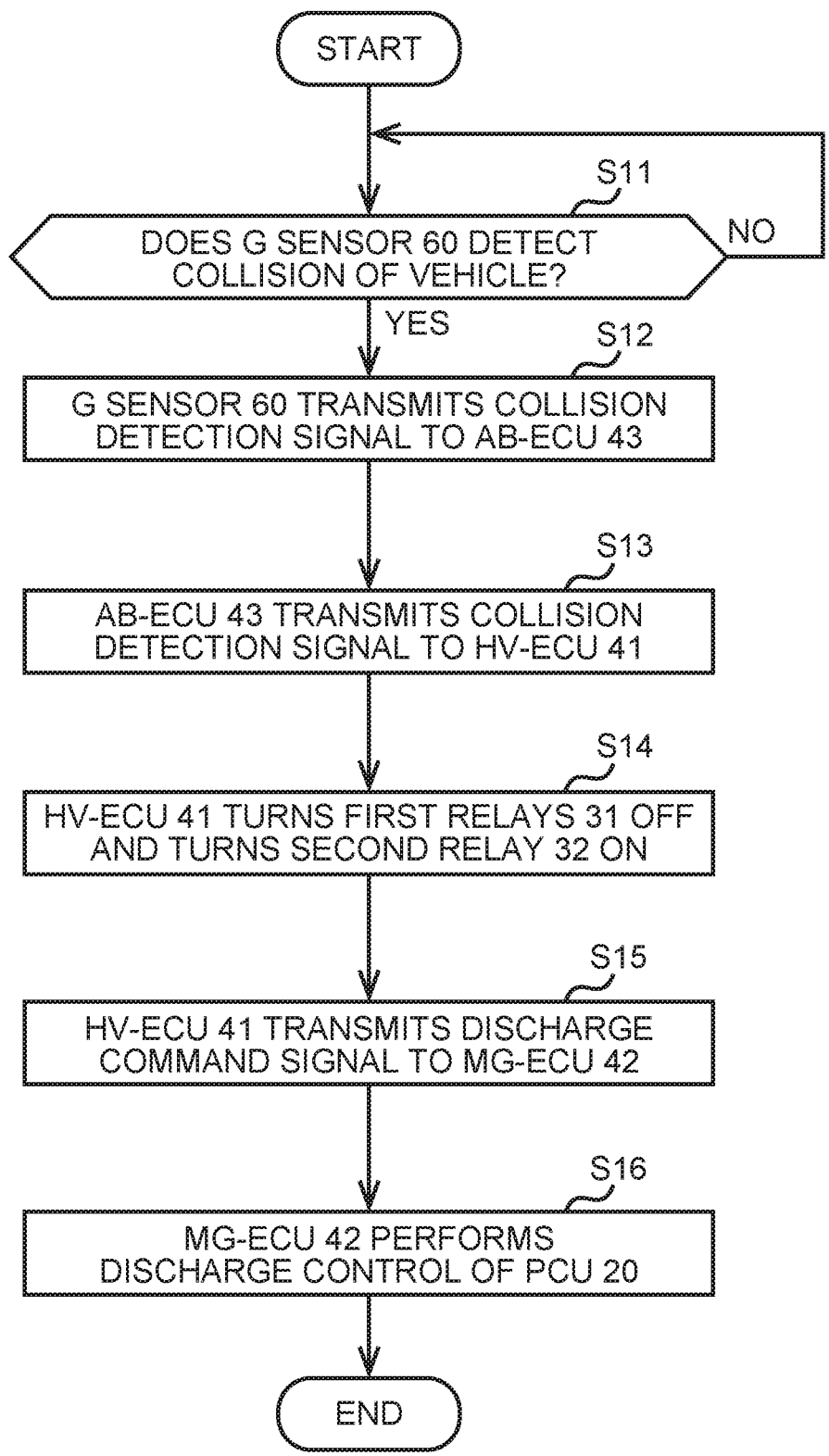

BATTERY SYSTEM FOR VEHICLE

CROSS-REFERENCE TO RELATED APPLICATIONS

This application claims priority to Japanese Patent Application No. 2017-019432 filed on Feb. 6, 2017, which is incorporated herein by reference in its entirety.

BACKGROUND

1. Technical Field

The technique disclosed in this specification relates to a battery system for a vehicle.

2. Description of Related Art

A battery system for a vehicle disclosed in Japanese Patent Application Publication No. 2014-141112 includes an auxiliary battery, an electric load electrically connected to the auxiliary battery through a first relay, and a controller electrically connected to the auxiliary battery through a second relay.

SUMMARY

When a vehicle collides, an auxiliary battery may be damaged, so that the performance of the auxiliary battery may deteriorate. For example, a cell inside the auxiliary battery may be damaged, so that the voltage of the auxiliary battery may decrease. Or internal resistance of the auxiliary battery may increase. A battery voltage (equal to a voltage applied to an electronic control unit when wiring resistance can be ignored) when the auxiliary battery supplies electric power is equal to a voltage obtained by subtracting, from the battery voltage when the auxiliary battery does not supply electric power, a value obtained by multiplying the internal resistance of the auxiliary battery by a supply current. In the technique of JP 2014-141112 A, when the vehicle collides, the voltage applied to the electronic control unit may decrease and the battery system may fail to operate appropriately due to such reasons as decrease in the battery voltage or increase in the internal resistance of the auxiliary battery when the auxiliary battery is not supplying electric power. Accordingly, this specification discloses a battery system having an electronic control unit that continues to operate appropriately even after collision of a vehicle.

An aspect of the present disclosure discloses a battery system for a vehicle. The battery system includes an auxiliary battery, first electric loads, a first electronic control unit, and a collision detection device. The first electric loads are electrically connected to the auxiliary battery through first relays. The first electronic control unit is electrically connected to the auxiliary battery through a second relay, and the first electronic control unit is configured to turn on and off at least the first relays and the second relay. The collision detection device is configured to transmit a collision detection signal to the first electronic control unit when detecting a collision of the vehicle. The first electronic control unit is configured to switch the first relays from on to off, while keeping the second relay turned on when receiving the collision detection signal.

According to the battery system, when the vehicle collides, the first electronic control unit turns off the first relays and interrupts electric power supply to the first electric loads. Interruption of electric power supply from the auxiliary battery to the first electric loads does not pose any particular problem. Meanwhile, as the first electronic control unit keeps the second relay turned on when the vehicle collides, an electric connection between the auxiliary battery and the first electronic control unit is maintained. As a result, while the electric power of the auxiliary battery is not supplied to the first electric loads, the electric power of the auxiliary battery is supplied to the first electronic control unit. This makes it possible to suppress the situation where the voltage applied to the first electronic control unit considerably decreases with respect to the power supply voltage of the auxiliary battery (the voltage when electric power supply from the auxiliary battery is not performed). Therefore, it is possible to suppress decrease in the voltage that is applied to the electronic control unit that requires the electric power from the auxiliary battery when the vehicle collides. Therefore, even after the vehicle collides, the electronic control unit continues to appropriately operate.

The first electric loads are elements that allow restricted operation when the vehicle collides. That is, the first electric loads are elements that allow interrupted electric power supply from the auxiliary battery when the vehicle collides. On the contrary, the first electronic control unit is an element such that restricted operation is not desirable when the vehicle collides. That is, the first electronic control unit is an element such that interruption of electric power supply from the auxiliary battery is not desirable when the vehicle collides. For example, the first electronic control unit requires the electric power from the auxiliary battery since the first electronic control unit performs discharge control to discharge the electric power stored in the electric power converter, when the vehicle collides.

The voltage applied to the electronic control unit decreases more largely as the electric current supplied from the auxiliary battery is larger. In the battery system in JP 2014-141112 A, the auxiliary battery supplies electric power to both the first electric load and the electronic control unit even after a collision of the vehicle. Accordingly, the supply current is large, so that the voltage applied to the electronic control unit decreases largely after the collision of the vehicle.

In the technique disclosed in the present disclosure, the auxiliary battery does not supply electric power to the first electric loads after a collision of the vehicle. Accordingly, the supply current is kept low, and so the decrease in the voltage that is applied to the electronic control unit after the collision of the vehicle is suppressed. This increases the opportunity that the electronic control unit continues to properly operate.

According to the technique described in the present disclosure, electric power is not supplied to the first electric loads other than the electronic control unit after collision of the vehicle. Accordingly, continuous operation of the first electric loads is failed. The first electric loads that receive electric power from the auxiliary battery are auxiliary machines, such as an air-conditioner, a navigation device, or an electric power steering device. It poses no particular problem if the operation of the auxiliary machines is restricted after the collision of the vehicle.

The battery system may further include an electric power converter and a second electronic control unit. The electric power converter may be configured to convert direct-current electric power of a main battery for vehicle travel into alternating-current electric power, and supply the converted electric power to a motor for vehicle travel. The second electronic control unit may be electrically connected to the auxiliary battery through a second relay, and the second electronic control unit may be configured to control operation of the electric power converter. Moreover, (i) the first electronic control unit may be configured to transmit a discharge command signal to the second electronic control unit when receiving the collision detection signal, and (ii) the second electronic control unit may be configured to control operation of the electric power converter, and discharge electric power stored in a capacitor included in the electric power converter when receiving the discharge command signal.

The technique described in the present disclosure utilizes the fact that the operation of some of the first electric loads that receive electric power supply from the auxiliary battery may be restricted without any problems after a collision of the vehicle, and therefore stopping the electric power supply to such first electric loads increases the possibilities of being able to secure the voltage applied to the electronic control unit.

In the battery system, the collision detection device may further have an acceleration sensor (G sensor), and may electrically be connected to the auxiliary battery through the second relay. The battery system may have a second electric load electrically connected to the auxiliary battery through the second relay.

The battery system for a vehicle can suppress the decrease in the voltage that is applied to the electronic control unit that requires electric power from the auxiliary battery when the vehicle collides, and therefore can continue to appropriately operate the electronic control unit even after the vehicle collides.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2 is a flowchart illustrating processing performed when the vehicle illustrated in FIG. 1 collides.

DETAILED DESCRIPTION OF EMBODIMENTS

Figure 1:
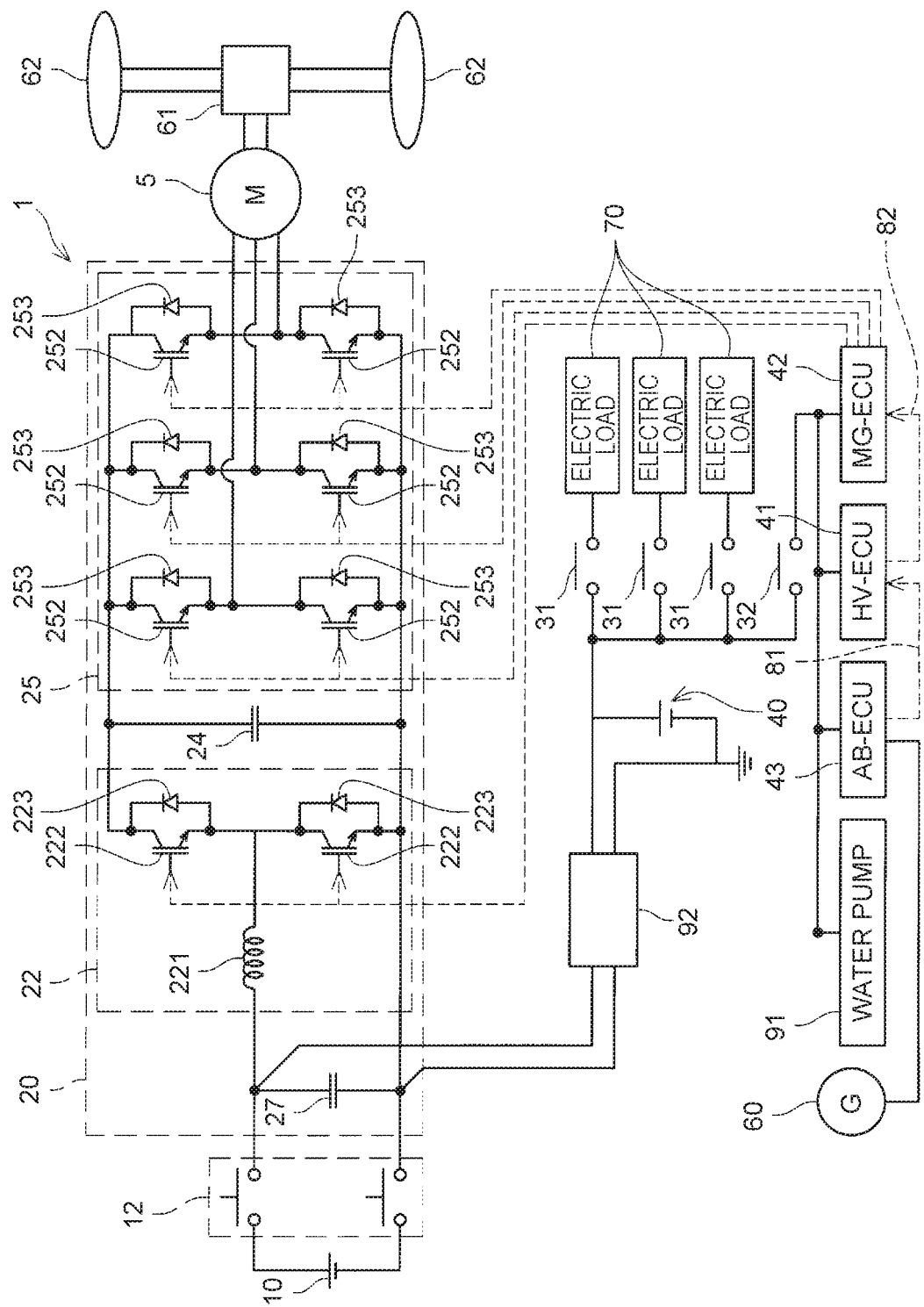
FIG. 1 illustrates the schematic configuration of a battery system for a vehicle according to an embodiment of the present disclosure.

A battery system 1 for a vehicle according to an embodiment as one example of the present disclosure will be described with reference to the drawings. As illustrated in FIG. 1, the battery system 1 includes a main battery 10, a system main relay 12, a power control unit (PCU) 20, and a motor 5 for the vehicle. The battery system 1 includes an auxiliary battery 40, a plurality of electric loads 70, a hybrid vehicle-electronic control unit (HV-ECU) 41, a motor generator-electronic control unit (MG-ECU) 42, an air bag-electronic control unit (AB-ECU) 43, a water pump 91, and an acceleration sensor (referred to as a G sensor below) 60.

The battery system 1 illustrated in FIG. 1 is mounted, for example, on a hybrid vehicle (illustration omitted). The hybrid vehicle is a vehicle that travels with an electric motor and an unillustrated gasoline engine as power sources. The vehicle mounted with the battery system 1 may be a motor vehicle that does not include the gasoline engine.

The main battery 10 for the vehicle stores electric power for vehicle travel. For example, the main battery 10 is a nickel-hydrogen battery or a lithium ion battery. The main battery 10 outputs direct-current electric power. The main battery 10 is electrically connected to the PCU 20 through the system main relay 12. The main battery 10 supplies the direct-current electric power to the PCU 20 through the system main relay 12.

The system main relay 12 is disposed between the main battery 10 and the PCU 20, and is electrically connected to both the components. The system main relay 12 turns on and off an electric connection between the main battery 10 and the PCU 20. That is, the system main relay 12 electrically connects or disconnects the main battery 10 and the PCU 20.

The PCU 20 is electrically connected to the main battery 10 and the motor 5. The PCU 20 is a device that converts the direct-current electric power supplied from the main battery 10 into alternating-current electric power, and supplies the converted electric power to the motor 5. The PCU 20 can also convert the alternating-current electric power generated by the motor 5 into direct-current electric power, and can supply the converted electric power to the main battery 10. The PCU 20 includes a filter capacitor 27, a converter 22, a smoothing capacitor 24, and an inverter 25.

The filter capacitor 27 is disposed between the system main relay 12 and the converter 22, and is electrically connected to both the components.

The converter 22 is disposed between the filter capacitor 27 and the smoothing capacitor 24, and is electrically connected to both the components. The converter 22 steps up the electric power supplied from the main battery 10. The converter 22 steps up the direct current voltage of the main battery 10. When the motor 5 functions as an electric generator, the converter 22 steps down the electric power supplied from the motor 5. Therefore, the converter 22 functions as a step-up converter and a step-down converter.

The converter 22 includes a reactor 221, a plurality of transistors 222, and a plurality of diodes 223. In the converter 22, as the transistors 222 are turned on and off, the direct-current electric power output from the main battery 10 is stepped up. Or as the transistors 222 are turned on and off, the electric power supplied from the motor 5 is stepped down.

The smoothing capacitor 24 is disposed between the converter 22 and the inverter 25, and is electrically connected to both the components. The smoothing capacitor 24 is connected in parallel with the converter 22 and the inverter 25. The smoothing capacitor 24 smoothes the direct-current voltage stepped-up by the converter 22.

The inverter 25 is disposed between the smoothing capacitor 24 and the motor 5, and is electrically connected to both the components. The inverter 25 converts the direct-current electric power supplied from the main battery 10 into alternating-current electric power. The inverter 25 converts the direct-current voltage stepped up by the converter 22 into alternating-current voltage. When the motor 5 functions as an electric generator, the inverter 25 converts the alternating-current electric power supplied from the motor 5 into direct-current electric power.

The inverter 25 includes a plurality of transistors 252, and a plurality of diodes 253. In the inverter 25, when the transistors 252 are turned on and off, the direct-current electric power is converted into alternating-current electric power, or alternating-current electric power is converted into direct-current electric power.

The motor 5 is a power source for vehicle travel. The motive power of the motor 5 is transmitted to wheels 62 of the vehicle through a power split device 61. The motor 5 may function as an electric generator when the vehicle decelerates.

The auxiliary battery 40 of the vehicle stores electric power for the ECU and electric power for electric loads of the vehicle. The auxiliary battery 40 is a lead storage battery, for example. The auxiliary battery 40 also stores the electric power for discharge control at the time of discharging charges stored in the smoothing capacitor 24 of the PCU 20. The auxiliary battery 40 is connected to the PCU 20 through a DC-DC converter 92.

The electric loads 70 are electrically connected to the auxiliary battery 40 through first relays 31. The plurality of electric loads 70 is connected to the auxiliary battery 40 through the plurality of first relays 31. In the present embodiment, three electric loads 70 are connected to the auxiliary battery 40. The electric loads 70 each operate with the electric power supplied from the auxiliary battery 40. Examples of the electric loads 70 include an electric power steering, an electronic control brake system, a head lamp, and an air-conditioning fan motor.

Each of the first relays 31 are disposed between the auxiliary battery 40 and a corresponding one of the electric loads 70, and are electrically connected to both the components. Each of the first relays 31 turns on and off an electric connection between the auxiliary battery 40 and a corresponding one of the electric loads 70. That is, the first relays 31 electrically connect or disconnect the auxiliary battery 40 and the electric loads 70.

The HV-ECU 41 includes, for example, a CPU, a memory, and an input-output port. The HV-ECU 41 controls operation of a plurality of component members of the vehicle in an integrated manner. The HV-ECU 41 controls operation of the entire vehicle. For example, the HV-ECU 41 performs control and the like so as to use only the motor 5 as a power source of the vehicle when the vehicle starts traveling and to use both the motor 5 and the engine (illustration omitted) as a power source of the vehicle when the vehicle accelerates during traveling. The HV-ECU 41 is electrically connected to the auxiliary battery 40 through a second relay 32. The HV-ECU 41 operates with the electric power supplied from the auxiliary battery 40. The HV-ECU 41 turns on and off the first relays 31 and the second relay 32. The HV-ECU 41 transmits a control signal to the MG-ECU 42.

The MG-ECU 42 includes, for example, a CPU, a memory, and an input-output port. The MG-ECU 42 controls operation of the PCU 20. Based on the control signal received from the HV-ECU 41, the MG-ECU 42 performs pulse width modulation (PWM) control to control on-off of the transistors 222 of the converter 22, and to control on-off of the transistors 252 of the inverter 25. The MG-ECU 42 is electrically connected to the auxiliary battery 40 through the second relay 32. The MG-ECU 42 operates with the electric power supplied from the auxiliary battery 40.

The AB-ECU 43 includes, for example, a CPU, a memory, and an input-output port. The AB-ECU 43 controls operation of an airbag (illustration omitted) mounted on the vehicle. The AB-ECU 43 expands and develops the airbag, when the vehicle collides with something. The AB-ECU 43 is electrically connected to the auxiliary battery 40 through the second relay 32. The AB-ECU 43 operates with the electric power supplied from the auxiliary battery 40.

The HV-ECU 41 and the AB-ECU 43 are connected through an AB-HV communication line 81 so as to communicate through the AB-HV communication line 81. The HV-ECU 41 and the MG-ECU 42 are connected through an HV-MG communication line 82 so as to communicate through the HV-MG communication line 82.

The second relay 32 is disposed between the auxiliary battery 40 and the HV-ECU 41, and is electrically connected to both the components. The second relay 32 turns on and off an electric connection between the auxiliary battery 40 and the HV-ECU 41. That is, the first second relay 32 electrically connects or disconnects the auxiliary battery 40 and the HV-ECU 41. The second relay 32 also turns on and off an electric connection between the auxiliary battery 40 and the MG-ECU 42, and an electric connection between the auxiliary battery 40 and the AB-ECU 43.

The auxiliary battery 40 is also connected to the water pump 91 through the second relay 32. The water pump 91 is a device that pumps a coolant for cooling each element of the PCU 20. The water pump 91 operates with the electric power supplied from the auxiliary battery 40.

The G sensor 60 of the vehicle detects acceleration and deceleration of the vehicle. The G sensor 60 is mounted on the vehicle. When the traveling vehicle collides with something, travel speed of the vehicle rapidly drops. As a result, deceleration of the vehicle increases. The G sensor 60 detects a collision of the vehicle based on the deceleration of the vehicle. The G sensor 60 is connected to the AB-ECU 43. The G sensor 60 transmits a collision detection signal to the AB-ECU 43 when detecting the collision of the vehicle. The G sensor 60 transmits the collision detection signal when the detected deceleration is equal to or above a specified deceleration.

A description is now given of the operation of the battery system 1. In the battery system 1, the PCU 20 converts the direct-current electric power supplied to the PCU 20 from the main battery 10 of the vehicle into alternating-current electric power, and supplies the alternating-current electric power to the motor 5. As a consequence, the motor 5 rotates, and the vehicle travels with the driving force of the motor 5. In the battery system 1, high-voltage electric power is stored in the smoothing capacitor 24 in the process of operating the PCU 20. Accordingly, when the traveling vehicle collides with something (for example, another car), it is desirable to swiftly discharge the electric power stored in the smoothing capacitor 24 to ensure safety.

FIG. 2 is a flowchart illustrating processing performed when the vehicle collides. As illustrated in FIG. 2, when the vehicle collides with something, the G sensor 60 determines whether or not the collision of the vehicle is detected in step S11. When the G sensor 60 detects the collision of the vehicle, "Yes" is determined, and the processing proceeds to step S12. When the G sensor 60 does not detect the collision of the vehicle, No is determined and the processing is in standby. The G sensor 60 detects the collision of the vehicle based on the deceleration of the vehicle.

Next, in step S12, the G sensor 60 transmits a collision detection signal to the AB-ECU 43. The collision detection signal is a signal indicative of the collision of the vehicle with something. The AB-ECU 43 receives the collision detection signal. The AB-ECU 43 expands and develops the airbag when receiving the collision detection signal.

Next, in step S13, the AB-ECU 43 transmits the received collision detection signal to the HV-ECU 41. That is, the collision detection signal is transmitted from the G sensor 60 to the HV-ECU 41 through the AB-ECU 43. The HV-ECU 41 receives the collision detection signal.

Next, in step S14, the HV-ECU 41 switches the first relays 31 from on to off. As a consequence, an electric connection between the auxiliary battery 40 and the electric loads 70 is interrupted. The electric power of the auxiliary battery 40 is not supplied to the electric loads 70. In step S14, the HV-ECU 41 keeps the second relay 32 turned on. As a consequence, an electric connection between the auxiliary battery 40 and the HV-ECU 41 is maintained. The electric power of the auxiliary battery 40 continues to be supplied to the HV-ECU 41.

Next, in step S15, the HV-ECU 41 transmits a discharge command signal to the MG-ECU 42. The discharge command signal is a signal to command discharge of the electric power stored in the smoothing capacitor 24 of the PCU 20. The MG-ECU 42 receives the discharge command signal.

Next, in step S16, the MG-ECU 42 performs discharge control of the PCU 20. That is, the MG-ECU 42 controls the PCU 20 to discharge the electric power stored in the smoothing capacitor 24 of the PCU 20. For example, the MG-ECU 42 controls on-off of the transistors 252 of the inverter 25 such that a d-shaft current may flow into the motor 5. As a consequence, the electric power stored in the smoothing capacitor 24 is discharged.

The configuration and operation of the battery system 1 for a vehicle have been described. As is clear from the above description, the battery system 1 for a vehicle includes the auxiliary battery 40, the electric loads 70 electrically connected to the auxiliary battery 40 through the first relays 31, and the HV-ECU 41 electrically connected to the auxiliary battery 40 through the second relay 32. The battery system 1 also includes the G sensor 60 that transmits a collision detection signal to the HV-ECU 41 through the AB-ECU 43, when collision of the vehicle is detected. When receiving the collision detection signal transmitted from the G sensor 60, the HV-ECU 41 switches the first relays 31 from on to off while keeping the second relay 32 turned on.

The HV-ECU 41 in the battery system 1 is an element that requires the electric power of the auxiliary battery 40, when the vehicle collides. For example, when the vehicle collides, the HV-ECU 41 requires the electric power of the auxiliary battery 40 in order to perform discharge control of the PCU 20. The HV-ECU 41 performs various kinds of control with respect to the vehicle with the electric power of the auxiliary battery 40, even when the vehicle collides. Meanwhile, the electric load 70 in the battery system 1 for a vehicle is an element that does not particularly require the electric power of the auxiliary battery 40, when the vehicle collides. If the operation of the electric load 70 should be restricted, it poses no particular problem.

In the battery system 1, the HV-ECU 41 turns the first relays 31 off so as to interrupt an electric connection between the auxiliary battery 40 and the electric loads 70 when the vehicle collides. As a result, the electric power of the auxiliary battery 40 is not supplied to the electric loads 70. As a consequence, the number of the elements that receive electric power supply from the auxiliary battery 40 decreases. Interrupting electric power supply from the auxiliary battery 40 to the electric loads 70 does not pose any particular problem. Even when the operation of the electric loads 70 is restricted, discharge control of the PCU 20 can be performed.

As the HV-ECU 41 keeps the second relay 32 turned on when the vehicle collides, an electric connection between the auxiliary battery 40 and the HV-ECU 41 is maintained. As a result, while the electric power of the auxiliary battery 40 is not supplied to the electric loads 70, the electric power of the auxiliary battery 40 is supplied to the HV-ECU 41. That is, while the number of the elements that receive electric power supply from the auxiliary battery 40 decreases, the HV-ECU 41 receives electric power supply from the auxiliary battery 40. This suppresses a considerable decrease in the voltage that is applied to the HV-ECU 41 with respect to the power supply voltage of the auxiliary battery 40. Therefore, it is possible to suppress decrease in the voltage that is applied to the element (i.e., HV-ECU 41) that requires the electric power of the auxiliary battery 40 when the vehicle collides. Interrupting electric power supply to the elements (i.e., the electric loads 70) that do not require the electric power of the auxiliary battery 40 when the vehicle collides suppresses the decrease in the voltage that is applied to the element (i.e., HV-ECU 41) that requires the electric power of the auxiliary battery 40. This makes it possible to avoid the situation where the operation of the HV-ECU 41 is restricted when the vehicle collides. Therefore, even after the vehicle collides, the HV-ECU 41 continues to appropriately operate.

The battery system 1 includes the PCU 20 that converts direct-current electric power of the main battery 10 for vehicle travel into alternating-current electric power, and supplies the converted electric power to the motor 5 for vehicle travel. The battery system 1 also includes the MG-ECU 42 electrically connected to the auxiliary battery 40 through the second relay 32. When receiving a collision detection signal transmitted by the G sensor 60, the HV-ECU 41 transmits a discharge command signal to the MG-ECU 42. When receiving the discharge command signal transmitted by the HV-ECU 41, the MG-ECU 42 controls operation of the PCU 20 to discharge the electric power stored in the smoothing capacitor 24 of the PCU 20.

According to such a configuration, when the vehicle collides, the electric power stored in the smoothing capacitor 24 of the PCU 20 can reliably be discharged. Since the second relay 32 is kept turned on, and the electric power of the auxiliary battery 40 is supplied to the HV-ECU 41 and the MG-ECU 42, discharge control of the PCU 20 is reliably executed. As a consequence, safety can be secured.

(Correspondence Relation) The HV-ECU 41 in the embodiment is one example of "first electronic control unit", and the MG-ECU 42 is one example of "second electronic control unit." The G sensor 60, or the G sensor 60 and the AB-ECU 43 are examples of "collision detection device," and the PCU 20 is one example of "electric power converter."

Although the embodiment as one example of the present disclosure has been described in the foregoing, specific aspects are not limited to the embodiment disclosed. In the following description, component members identical to those in the above description are designated by identical reference signs to omit a description thereof.

According to the embodiment, the water pump 91 as the second electric load is connected to the auxiliary battery 40 through the second relay 32. However, the present disclosure is not limited to this configuration. In another configuration of the embodiment, the water pump 91 may be connected to the auxiliary battery 40 through the first relay 31. That is, the water pump 91 may be one example of "first electric load." More specifically, the water pump 91 as the first electric load may be electrically connected to the auxiliary battery 40 through the first relay 31. In this case, when the vehicle collides, and the HV-ECU 41 turns the first relay 31 off, the electric power of the auxiliary battery 40 is not supplied to the water pump 91. This configuration may be allowed in some cases.

Technical components disclosed in the battery system for a vehicle of the present embodiment will be described below. The technical components described below are each independently useful.

A battery system for a vehicle may include an electric power converter configured to convert direct-current electric power of a main battery for vehicle travel into alternating-current electric power, and supply the converted electric power to a motor for vehicle travel, and a second electronic control unit electrically connected to an auxiliary battery through a second relay, the second electronic control unit being configured to control operation of the electric power converter. The first electronic control unit may transmit a discharge command signal to the second electronic control unit when receiving a collision detection signal. The second electronic control unit may control operation of the electric power converter and discharge electric power stored in a capacitor included in the electric power converter when receiving the discharge command signal.

According to such a configuration, when the vehicle collides, the first electronic control unit transmits a discharge command signal to the second electronic control unit, and the second electronic control unit performs discharge control to discharge the electric power stored in the capacitor of the electric power converter. When the vehicle collides, the electric power stored in the capacitor of the electric power converter can reliably be discharged. Accordingly, safety can be secured.

The second electronic control unit is an element such that restricted operation is not desirable when the vehicle collides. That is, the second electronic control unit is an element such that interruption of electric power supply from the auxiliary battery is not desirable when the vehicle collides. For example, the second electronic control unit requires the electric power of the auxiliary battery since the second electronic control unit performs discharge control to discharge the electric power stored in the electric power converter, when the vehicle collides.

Although specific examples of the present disclosure have been described in detail in the foregoing, they are merely illustrative and are not intended to restrict the claims of the disclosure. The technique described in the claims includes various modifications and deformations of the specific examples illustrated in the foregoing. The technological components described in this specification or in the drawings demonstrate technical usefulness independently or in various kinds of combinations, and are not limited to the combinations disclosed in the claims at the time of filing application. The technologies disclosed in this specification or in the drawings concurrently achieve a plurality of objects. Accomplishing one of the objects itself provides the technical usefulness thereof.

What is claimed is:

1. A battery system for a vehicle, the battery system comprising
   an auxiliary battery,
   first electric loads electrically connected to the auxiliary battery through first relays;
   a first electronic control unit electrically connected to the auxiliary battery through a second relay, the first electronic control unit being configured to turn on and off at least the first relays and the second relay;
   a collision detection device configured to transmit a collision detection signal to the first electronic control unit when detecting a collision of the vehicle, wherein the first electronic control unit is configured to switch the first relays from on to off, while keeping the second relay turned on when receiving the collision detection signal;
   an electric power converter configured to convert direct-current electric power of a main battery for vehicle travel into alternating-current electric power, the electric power converter being configured to supply the converted electric power to a motor for vehicle travel; and
   a second electronic control unit electrically connected to the auxiliary battery through a second relay, the second electronic control unit being configured to control operation of the electric power converter, wherein
   (i) the first electronic control unit is configured to transmit a discharge command signal to the second electronic control unit when receiving the collision detection signal; and
   (ii) the second electronic control unit is configured to control operation of the electric power converter, and the second electronic control unit is configured to discharge electric power stored in a capacitor included in the electric power converter when receiving the discharge command signal.

2. The battery system according to claim 1, wherein the collision detection device includes an acceleration sensor, the collision detection device being electrically connected to the auxiliary battery through the second relay.

3. The battery system according to claim 1, further comprising a second electric load electrically connected to the auxiliary battery through the second relay.

* * * * *